United States Patent
Wang et al.

(10) Patent No.: US 6,621,960 B2
(45) Date of Patent: Sep. 16, 2003

(54) METHOD OF FABRICATING MULTIPLE SUPERIMPOSED FIBER BRAGG GRATINGS

(75) Inventors: Qinglin Wang, San Jose, CA (US); Weiti Wu, Milpitas, CA (US); Weizhong Li, San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 29 days.

(21) Appl. No.: 10/057,800

(22) Filed: Jan. 24, 2002

(65) Prior Publication Data

US 2003/0138207 A1 Jul. 24, 2003

(51) Int. Cl.[7] ................................................ G02B 6/34
(52) U.S. Cl. ........................................................ 385/37
(58) Field of Search ........................... 385/37, 123, 124; 359/566, 573, 575

(56) References Cited

U.S. PATENT DOCUMENTS

| | | | |
|---|---|---|---|
| 4,474,427 A | 10/1984 | Hill et al. | 350/96.3 |
| 4,807,950 A | 2/1989 | Glenn et al. | 350/3.61 |
| 5,104,209 A | 4/1992 | Hill et al. | 385/27 |
| 5,367,588 A | 11/1994 | Hill et al. | 385/37 |
| 5,627,927 A | 5/1997 | Udd | 385/37 |
| 5,787,213 A * | 7/1998 | Brownlow | 385/37 |
| 5,903,689 A | 5/1999 | Painchaud et al. | 385/37 |
| 6,275,511 B1 | 8/2001 | Pan et al. | 372/6 |
| 6,442,305 B1 * | 8/2002 | Starodubov et al. | 385/13 |
| 2001/0051020 A1 * | 12/2001 | Kashyap | 385/37 |

OTHER PUBLICATIONS

Andreas Othonos et al.; "Fiber Bragg Gratings," p. 98–99; 1999 Artech House, Inc.
Andreas Othonos et al.; "Fiber Bragg Gratings, Chapter 2 Photosensitivity in Optical Fibers;" 1999 Artech House, Inc.

* cited by examiner

*Primary Examiner*—Hemang Sanghavi
(74) *Attorney, Agent, or Firm*—Lumen Intellectual Property Services, Inc.

(57) ABSTRACT

A method of fabricating multiple superimposed Bragg gratings in the core of a portion of a photosensitive fiber is provided where only one common phase-mask is used. The multiple superimposed Bragg gratings are inscribed in the portion of the photosensitive fiber by applying different predetermined longitudinal stresses to the portion for each corresponding writing. The different predetermined longitudinal stresses are applied to the portion of the photosensitive fiber by stretching the portion along its longitudinal axis bi-directionally and simultaneously such that the centers of all fiber Bragg gratings imprinted in the portion are substantially superimposed at the center of the portion of the photosensitive fiber. The wavelength interval of two superimposed fiber Bragg gratings can be finely tuned to a required value and the wavelength intervals of three or more superimposed fiber Bragg gratings can be optimally tuned to a required wavelength grid, either even or uneven, by changing the effective refractive index of a portion of a photosensitive fiber covering the multiple fiber Bragg gratings inscribed.

33 Claims, 3 Drawing Sheets

METHOD OF FABRICATING MULTIPLE SUPERIMPOSED FIBER BRAGG GRATINGS

FIELD OF THE INVENTION

The present invention relates generally to method of fabricating fiber Bragg gratings, and in particular to method of fabricating multiple superimposed fiber Bragg gratings.

BACKGROUND OF THE INVENTION

Fiber Bragg grating is now a key device in the established and emerging fields of optical communication and optical fiber sensing. There are basically two methods to photo-induce gratings in photosensitive optical fiber wave-guides, internal writing method and external writing method. The internal writing method was first described by K. O. Hill et al. and was disclosed in U.S. Pat. No. 4,474,427. In this method, coherent light having a wavelength in the visible region is launched into the core of a Ge-doped fiber from one end of the fiber. The light is reflected from the other end of the fiber. The forward propagating light and the backward propagating light interfere with each other to produce a standing wave with a period corresponding to half the wavelength of the writing light. By a photosensitive effect in the fiber, a refractive index grating with the period of the standing wave is written into the core of the fiber. The main drawback of this internal writing method is that only gratings with a period similar to that of a one-half the wavelength of the writing light can be made. The application of those fiber gratings written by internal writing method is substantially limited due to this drawback, especially in fiber communication areas.

Three general approaches of external writing method have been developed to overcome the drawbacks of internal writing method and actually make the application of fiber Bragg gratings in optical fiber communication areas possible. The first approach of external writing method was demonstrated by Glen et al. and was disclosed in U.S. Pat. No. 4,807,950. In this approach, an interferometer is used to split an incoming UV light into two beams that were subsequently recombined to form an interference pattern that side exposes a photosensitive fiber, inducing a permanent refractive index modulation in the core. As the Bragg grating period (which is identical to the period of the interference fringe pattern) of a fiber Bragg grating written in the core depends on both the irradiation wavelength and the half angle between the intersecting UV beams, theoretically Bragg gratings at any desired wavelength can be inscribed. The disadvantages of this approach include a susceptibility to mechanical vibration, relative complexity of the system and requirement for a UV laser source with good spatial and temporal coherence.

U.S Pat. No. 5,104,209 discloses a point-by-point approach of external writing method for fabricating Bragg gratings by inducing a change in the index of refraction corresponding to a grating plane one step at a time along the core of the fiber. The main advantage of this approach is its flexibility to alter the Bragg grating parameters. However, the point-by-point approach is a tedious process requiring a relatively long process time. Errors in the grating spacing due to thermal and/or mechanical vibration can occur. This limits the grating to a short length.

One of the most effective and mature approaches of external writing method for inscribing Bragg gratings in photosensitive fiber is the phase-mask approach. U.S. Pat. No. 5,367,588 discloses a phase-mask approach that employs a phase-mask (a diffractive optical element) to spatially modulate the UV writing beam. Phase-mask may be formed either holographically or by electron-beam lithography. The phase-mask is created as a one dimensional periodic surface-relief pattern. The profile of the periodic surface-relief grating is selected such that when a UV beam is incident on the phase-mask, the zero-order diffracted beam is suppressed to less than a few percent of the transmitted power. In addition, each of the diffracted plus and minus first orders is maximized to typically contain more than 35% of the transmitted power. The interference of the diffracted plus and minus first order beams produces a near-field fringe pattern with a period that is one-half of that of the phase-mask. The fringe pattern photo-imprints a refractive index modulation in the core of a photosensitive optical fiber that is placed in contact with or in close proximity to the phase-mask. Since its original demonstration in 1993, the phase-mask approach has been developed to a stage where the inscription of a nearly 100% reflective grating is now routine. U.S. Pat. No. 5,903,689 discloses a phase-mask-based method for spatially controlling the period and amplitude when inscribing a fiber Bragg grating in a photosensitive fiber.

As only one optical element is used to provide a robust and inherently stable method for producing fiber Bragg grating, the phase-mask approach substantially reduces the complexity and the cost of a fiber grating fabrication system. Since the fiber is usually disposed directly behind the phase-mask in the near field of the diffracted UV beams, sensitivity to mechanical vibration and therefore stability problems are minimized. Also, low temporal coherence does not affect the writing capacity as compared to the interferometric approach. However, the spatial coherence still plays an important role in the fabrication of Bragg gratings.

Multiple superimposed fiber Bragg gratings have been of great interest as a device in optical communications, lasers and sensor systems because multiple Bragg gratings at the same location basically perform a comb function that is ideal for manipulating, e.g. multiplexing and de-multiplexing, signals with different wavelengths. Writing all gratings at the same location of a fiber is well suited for optical integrated technology, where the physical size of a device is always a concern. Another advantage is the simplicity and cost-effectiveness for the athermal package structure that is one of the key technologies in fiber Bragg grating area. One general package can compensate the temperature induced wavelength shifts at the same time in all superimposed gratings at the same location.

Chirped Bragg gratings are highly valued in dispersion compensation applications of high-speed optical communication system. However, meaningful multi-channel dispersion compensation needs to cascade a plurality of single fiber Bragg gratings (each of them has a unpacked length of more than 10 cm) together that will result in large physical size and more complicated structure. Superimposing several chirped Bragg gratings at a same location can effectively reduce the physical size of such devices and can also substantially simplify the structure.

Multiple superimposed fiber Bragg gratings can also be used for material detection where the multiple Bragg lines can be designed to match the signature frequencies of a given material.

U.S. Pat. No. 5,627,927 discloses the use of two or more Bragg gratings superimposed at a same location of an optical fiber for sensing environment effect such as strain and temperature. However, this prior art reference does not specifically teach how the multiple superimposed Bragg gratings used are inscribed in the core of a photosensitive fiber.

U.S. Pat. No. 6,275,511 teaches two methods to create multiple superimposed Bragg gratings (column 4, lines 59–66). Both methods are on the basis of the phase-mask approach. The first method photo-induces multiple superimposed Bragg gratings by overwriting each of the fiber Bragg gratings with a corresponding phase-mask in an optical fiber. This method uses as many phase-masks as the number of gratings to be written in an optical fiber. Due to the changing of masks between each two consecutive writings, the configuration of the writing system can easily be altered and the repeated calibrations make the writing procedure a tedious process. The second method photo-induces multiple superimposed Bragg gratings by overwriting all of the fiber Bragg gratings with a single specially designed phase-mask that can generate interference patterns for all fiber Bragg gratings at the same time. This method actually transfers a part of the difficulty of writing multiple superimposed Bragg gratings into the difficulty of designing and manufacturing a more complicated phase mask. This method is not flexible or cost-effective because for each possible combination (number of gratings, different wavelengths required, wavelength intervals required) of fiber Bragg gratings to be written, a specially designed phase-mask is needed.

In optical communication applications, especially DWDM, OADM et al., the channel spacing and central wavelength accuracy for the multiple channels should generally obey the ITU-T grid. For a single fiber Bragg grating, the Bragg wavelength can be tuned, e.g. by altering the strain of the fiber, to a required valve during packaging process. If a device is composed by cascading several single fiber Bragg gratings with different wavelengths together, the wavelength interval of between two single Bragg gratings can be tuned by tuning their wavelength separately. Unfortunately, the wavelengths of multiple superimposed fiber Bragg gratings can generally only be linearly shifted together, e.g. by altering the strain of the fiber, during packaging process and the wavelength interval between two fiber Bragg gratings superimposed is generally not adjustable during packaging process.

Therefore, it is greatly desired that the wavelength interval of two superimposed fiber Bragg gratings can be finely tuned to a required value during writing procedure. It is also greatly desired that the wavelength intervals of three or more superimposed fiber Bragg gratings can be optimally tuned to a required wavelength grid, e.g. an ITU (International Telecommunication Union) wavelength plan, with an acceptable tolerance during writing procedure. It is also desired that the long-term stability of gratings can be improved by uniform UV exposure.

In view of the above, it would be an advance in the art to provide a method of fabricating multiple superimposed fiber Bragg gratings which uses only a single common phase-mask.

It would be a specially welcome advance to provide a method of fabricating multiple superimposed fiber Bragg gratings where the wavelength interval of two superimposed fiber Bragg gratings can be finely tuned to a required value and the wavelength intervals of three or more superimposed fiber Bragg gratings can be optimally tuned to a required wavelength grid, either even or uneven.

OBJECTS AND ADVANTAGES

It is a primary object of the present invention to provide a method of fabricating multiple superimposed fiber Bragg gratings in the core of a portion of a photosensitive fiber where only one common phase-mask is used. The superimposed multiple fiber Bragg gratings are inscribed in the portion of the photosensitive fiber by applying different predetermined longitudinal stresses to the portion for each corresponding writing.

It is a further object of the present invention to provide a method of fabricating multiple superimposed fiber Bragg gratings where different predetermined longitudinal stresses are applied to a portion of a photosensitive fiber by stretching or relaxing the portion along its longitudinal axis bi-directionally and simultaneously such that the centers of all fiber Bragg gratings imprinted in the portion are substantially superimposed at the center of the portion of the photosensitive fiber.

It is yet another object of the present invention to provide a method of fabricating multiple superimposed fiber Bragg gratings with a period of either even or uneven where the wavelength interval of two superimposed fiber Bragg gratings can be finely tuned to a required value and the wavelength intervals of three or more superimposed fiber Bragg gratings can be optimally tuned to a required wavelength grid, either even or uneven, by changing the effective refractive index of a portion of a photosensitive fiber covering the multiple fiber Bragg gratings inscribed.

It is yet another object of the present invention provide a method of fabricating multiple superimposed fiber Bragg gratings where the effective refractive index is changed by applying, for a predetermined period of time, a substantially uniform UV beam directly on the portion of a photosensitive fiber covering the multiple fiber Bragg gratings inscribed.

It is yet another object of the present invention provide a method of fabricating multiple superimposed fiber Bragg gratings where the predetermined period of time for applying a substantially uniform UV beam directly on the portion of a photosensitive fiber is decided by an optimal method, e.g. minimum mean square error method.

As there is only one common phase-mask is required in the method of present invention for fabricating multiple superimposed fiber Bragg gratings at a same location of a photosensitive fiber, most existing phase-mask based fabricating systems for inscribing single fiber Bragg grating can be used, except for adding means for illuminating substantially uniform UV light beam and means for stretching the portion along its longitudinal axis bi-directionally and simultaneously. Most of commercially available phase-masks can be used in the method of the present invention. The method of the present invention is not only cost effective but also suitable for mass production.

These and numerous other objects and advantages of the present invention will become apparent upon reading the detailed description.

SUMMARY

In accordance with the present invention, there is provided a method of fabricating a first Bragg grating and a second Bragg grating in a portion of a photosensitive fiber. The first and the second Bragg gratings are overlapped and have a required Bragg wavelength interval S between each other.

The method has steps of disposing an optical phase-mask adjacent to the portion of the photosensitive fiber; subjecting the portion to a first predetermined longitudinal stress; applying a collimating UV light beam through the phase-mask to create the first Bragg grating in the portion; subjecting the portion to a second predetermined longitudinal stress; and applying the collimating UV light beam through the phase-mask to create the second Bragg grating in the portion. The first and the second predetermined stresses are selected to produce a tentative Bragg wavelength interval S' between the first and the second Bragg gratings such that the tentative Bragg wavelength interval S' is slightly smaller than the required Bragg wavelength interval S. The method also has step of tuning the tentative Bragg wavelength interval S' substantially to the required Bragg wavelength interval S by changing the effective refractive index of the portion covering the first and second fiber Bragg gratings.

The step of tuning the tentative Bragg wavelength interval S', substantially to the required Bragg wavelength interval S can be performed by applying a substantially uniform UV light beam directly on the portion covering both the first and the second Bragg gratings for a predetermined period of time. It should be noted that other methods, either chemical, physical or mechanical, which can change the effective refractive index of a portion of a photosensitive fiber can be used in present invention for tuning the wavelength interval between the two fiber Bragg gratings.

The steps of subjecting the portion to a first predetermined longitudinal stress and subjecting the portion to a second predetermined longitudinal stress are performed by stretching or relaxing the portion bi-directionally and simultaneously such that the center of the portion is kept substantially fixed with respect to the phase mask. The phase mask can be an even period phase mask, a non-even period phase mask or their equivalents.

The collimating UV light beam is provided by a UV source selected from a group consisting of excimer laser, frequency-doubled dye laser, frequency-doubled parametric oscillator, argon ion laser and copper vapor laser. The collimating UV light beam and the substantially uniform UV light beam can be provided by a same UV source.

The portion of the photosensitive fiber is coupled to a source and an optical spectral analyzer (OSA) for monitoring. The source is selected from a group consisting of white source, e.g. a broadband LED/SLED, and wavelength tunable source, e.g. a tunable diode laser.

The method can further have step of tuning the Bragg wavelength of the first Bragg grating by changing the effective refractive index of the portion before creating the second Bragg grating, e.g. by applying a substantially uniform UV light beam directly on the portion.

It is apparent to those skilled in the art that the method should not be considered to be limited in inscribing multiple superimposed fiber Bragg gratings with only two Bragg gratings. This method is well suited for inscribing multiple superimposed fiber Bragg gratings with two or more Bragg gratings. The first and the second fiber Bragg gratings should be considered as any two of all fiber Bragg gratings superimposed at a same location/portion of a photosensitive fiber. The tentative Bragg wavelength interval S' and the required Bragg wavelength interval S between the first and the second fiber Bragg gratings should be considered as the tentative Bragg wavelength interval and the required Bragg wavelength interval between any two of all fiber Bragg gratings superimposed at a same location/portion of a photosensitive fiber.

In accordance with the present invention, there is further provided a method of fabricating a first Bragg grating, a second Bragg grating and a third Bragg grating in a portion of a photosensitive fiber. The first, the second and the third Bragg gratings are overlapped and have a first required Bragg wavelength interval $S_1$ between the first and the second Bragg gratings and a second required Bragg wavelength interval $S_2$ between the second and the third Bragg gratings.

The method has steps of disposing an optical phase mask adjacent to the portion; subjecting the portion to a first predetermined longitudinal stress; applying a collimating UV light beam through the phase mask to create the first Bragg grating in the portion; subjecting the portion to a second predetermined longitudinal stress; applying a collimating UV light beam through the phase mask to create the second Bragg grating in the portion; subjecting the portion to a third predetermined longitudinal stress; applying the collimating UV light beam through the phase mask to create the third Bragg grating in the portion.

The first, the second and the third predetermined stresses are selected to produce a first tentative Bragg wavelength interval $S_1'$ between the first and the second Bragg gratings and a second tentative Bragg wavelength interval $S_2'$ between the second and the third Bragg gratings such that the first tentative Bragg wavelength interval $S_1'$ and the second tentative Bragg wavelength interval $S_2'$ are slightly smaller than the first required Bragg wavelength interval $S_1$ and the second required Bragg wavelength interval $S_2$ respectively.

The method also has step of tuning the first and the second tentative Bragg wavelength intervals $S_1'$, $S_2'$ optimally to the first and the second required Bragg wavelength intervals $S_1$, $S_2$ by changing the effective refractive index of the portion. The step of tuning the first and the second tentative Bragg wavelength intervals $S_1'$, $S_2'$ optimally to the first and the second required Bragg wavelength intervals $S_1$, $S_2$ can be performed by applying a substantially uniform UV light beam directly on the portion covering the first, the second and the third Bragg gratings for a predetermined period of time. It should be noted that other methods, either chemical, physical or mechanical, which can change the effective refractive index of a portion of a photosensitive fiber can be used in present invention for optimally tuning the first and the second tentative Bragg wavelength intervals to the first and the second required Bragg wavelength intervals.

The predetermined period of time can be decided by an optimal method, e.g. minimum mean square error method. It is also apparent to those skilled in the art that other optimal method can be used in the method of the present invention to decide the predetermined period of time for tuning on the basis of the power of the UV source and the photosensitive property of the fiber.

The steps of subjecting the portion to a first predetermined longitudinal stress, subjecting the portion to a second predetermined longitudinal stress and subjecting the portion to a third predetermined longitudinal stress are performed by stretching or relaxing the portion of the photosensitive fiber bi-directionally and simultaneously such that the center of the portion is kept substantially fixed with respect to the phase mask.

The phase mask can an even period phase mask, a non-even period phase mask or their equivalents.

The collimating UV light beam is provided by a UV source selected from a group consisting of excimer laser, frequency-doubled dye laser, frequency-doubled parametric oscillator, argon ion laser and copper vapor laser. The collimating UV light beam and the substantially uniform UV light beam can be provided by a same UV source.

The portion of the photosensitive fiber is coupled to a source and an optical spectral analyzer (OSA) for monitoring. The source is selected from a group consisting of white source, e.g. a broadband LED/SLED, and wavelength tunable source, e.g. a tunable diode laser.

The method can further have step of tuning the Bragg wavelength of the first Bragg grating by changing the effective refractive index of the portion before writing the second Bragg grating, e.g. by applying a substantially uniform UV light beam directly on the portion. The method can also further have step of tuning the Bragg wavelength of the first Bragg grating, the Bragg wavelength of the second Bragg grating and the Bragg wavelength difference between the first and the second Bragg gratings by change the effective refractive index of the portion, e.g. by applying a substantially uniform UV light beam directly on the portion, before writing the third Bragg grating. It is apparent to those skilled in the art that other methods, either chemical, physical or mechanical, which can change the effective refractive index of a portion of a photosensitive fiber can be used in the method of the present invention.

It is apparent to those skilled in the art that the method should not be considered to be limited in inscribing superimposed multiple fiber Bragg gratings with only three Bragg gratings. This method is well suited for inscribing superimposed multiple fiber Bragg gratings with three or more Bragg gratings. The optimal method used in the present invention to decide the predetermined period of time for optimally tuning the tentative Bragg wavelength intervals to the required Bragg wavelength intervals, e.g. an ITU wavelength plan/grid, is well suited for fabricating superimposed multiple fiber Bragg gratings with three or more fiber Bragg gratings.

The above summary of the present invention is not intended to describe each disclosed embodiment or every implementation of the present invention. The figures and the detailed description will more particularly exemplify these embodiments.

BRIEF DESCRIPTION OF THE FIGURES

FIG. 1b is a side view (along B—B direction) of the fabricating system shown in FIG. 1a;

Figure 1A:
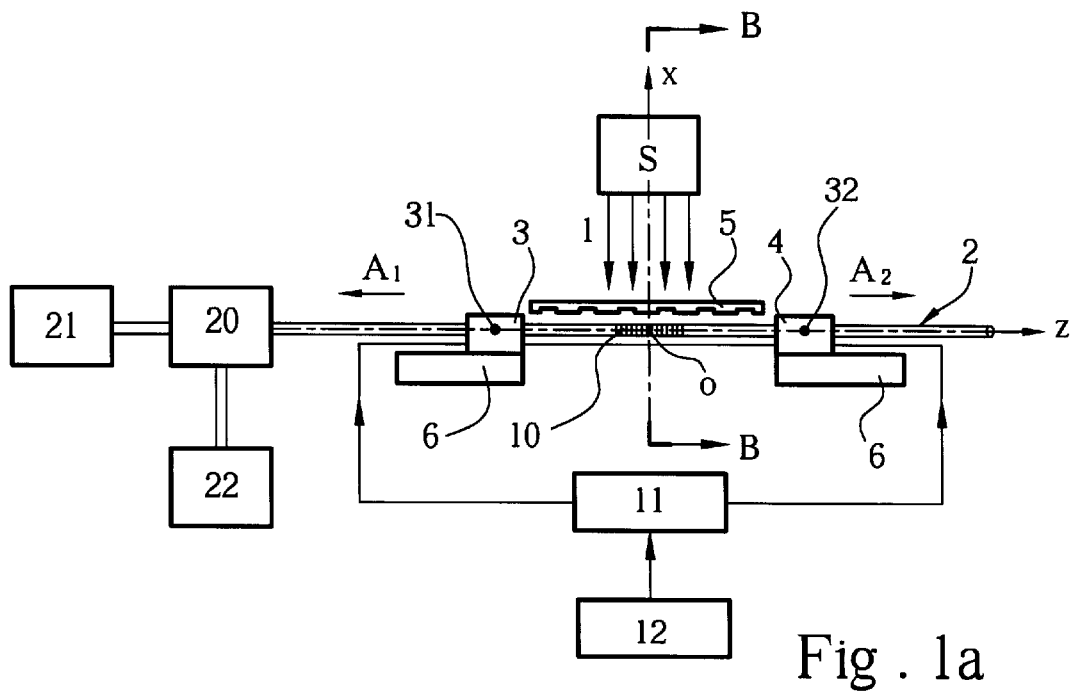
FIG. 1a is a schematic diagram of a fiber Bragg grating fabricating system used in the present invention.

While the invention is amenable to various modifications and alternative forms, specifies thereof have been shown by way of examples in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

The Bragg Grating wavelength of a fiber Bragg grating is related to the period ($\Lambda$) of the fiber Bragg grating and the effective index of refraction (neff) as shown in equation (1):

$$\lambda = 2n_{eff}\Lambda \qquad (1)$$

One of the essences of the method of the present invention is changing the period $\Lambda$, e.g. by subjecting a portion of a photosensitive fiber to different predetermined stresses, to inscribe accordingly multiple superimposed fiber Bragg gratings with different wavelengths while only one common phase-mask is used. The relationship between the strain and Bragg wavelength of a fiber Bragg grating is discussed in Andreas Othonos and Kyriacos Kalli, *Fiber Bragg Gratings* (Artech House, Boston-London, 1999), P98–99.

If the period of the phase mask ($\Lambda_m$) is 1070 nm, $n_{eff}$ is 1.451 and the period of a fiber Bragg grating written using the phase mask is $\Lambda = \Lambda_m/2 = 535$ nm, the Bragg wavelength of the grating is $\lambda = 2n_{eff}\Lambda = 2*1.451*535 = 1552.57$ nm. If the period $\Lambda$ of grating changes 1% (5.35 nm), e.g. by stretching the portion of fiber where the grating is written, the Bragg wavelength of the grating will be shifted to 1568.10 nm. The Bragg wavelength is shifted by 15.53 nm that is an equivalence of about 1940 GHz channel spacing. The length of a portion of a fiber can generally be linearly tuned for 1% to 3%, or even more, that is sufficient for inscribing multiple superimposed Bragg fiber gratings using the method of the present invention for most applications.

Another essence of the method of the present invention is finely tuning the wavelength interval of two superimposed fiber Bragg gratings to a required value, or optimally tuning the wavelength intervals of three or more superimposed fiber Bragg gratings to a required wavelength grid by changing the effective index of refraction of the portion of the photosensitive fiber where the gratings are superimposed. Referring to equation (1), as different fiber Bragg gratings written at a same location have different periods, their Bragg wavelengths will shift in same direction, but in different quantities if the effective index of refraction is tuned at the same time. The wavelength of a grating with longer period will shift more than that of a grating with shorter period. Therefore, the wavelength interval of two superimposed fiber Bragg gratings can be finely tuned to a required value and the wavelength intervals of three or more superimposed fiber Bragg gratings can be optimally tuned to a required wavelength grid by this principle.

FIG. 1a is a schematic diagram of a fiber Bragg grating fabricating system 100 used in the present invention. In FIG. 1a, S is a UV source means to provide a substantially collimating UV beam 1 for inscribing through the phase-mask 5 Bragg gratings on the portion 10 of a photosensitive fiber 2. The phase-mask 5 is disposed adjacent to the fiber portion 10 so that the fiber portion 10 is in the near field of the diffracted UV beams of the UV beam 1. The fiber 2 is hold by a first holder 3 and a second holder 4 at point 31 and point 32 respectively. The first holder 3 and the second holder 4 are amounted on a table 6 and are driven by a driving means 11 that is controlled by a controller 12. The first holder 3 and the second holder 4 can move along the Z axis in opposite directions simultaneously with same moving distances, either stretching the fiber portion 10 or relaxing it, so that the center O of the portion 10 is substantially fixed with respect to the phase-mask 5. In order to conduct real-time monitoring of the writing procedure, the fiber 2 is coupled to a circulator 20 (or a 3 dB coupler) that in turn is coupled to a broadband LED/SLED 21 (or a tunable laser diode) and an OSA (Optical spectral analyzer) 22.

Figure 1B:
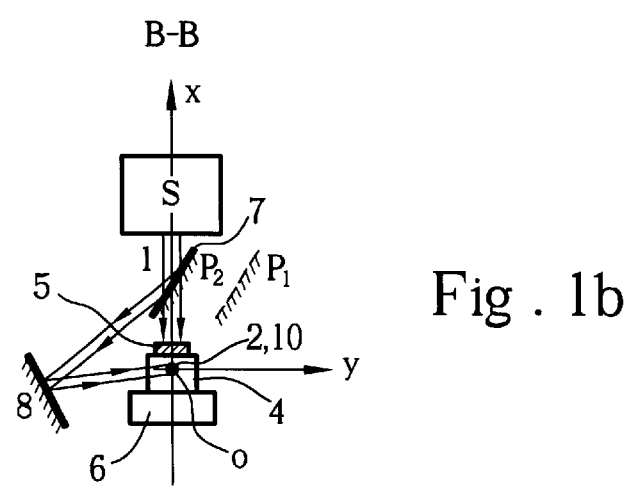

FIG. 1b is a side view (along B—B direction) of the fabricating system 100 shown in FIG. 1a. In FIG. 1b, a first mirror 7 and a second mirror 8 are disposed to provide direct illumination of a substantially uniform UV light to the fiber portion 10 of the fiber 2. When the system 100 inscribes a Bragg grating through phase-mask 5, the first mirror 7 is at position $P_1$. When the system 100 needs to illuminate the portion 10 of the fiber 2 directly, the first mirror 7 is moved to position $P_2$. The means (mirrors 7, 8) for redirecting the UV light to provide direct illumination to the fiber portion 10 is important when direct substantially uniform UV illumination is needed between two consecutive writings or in continuous mass production. By using the means for redirecting the UV light, it is unnecessary to remove the mask when direct UV illumination is required. Other means for redirecting the UV light to provide direct illumination to the fiber portion 10 can also be used in this system.

Figure 2A:
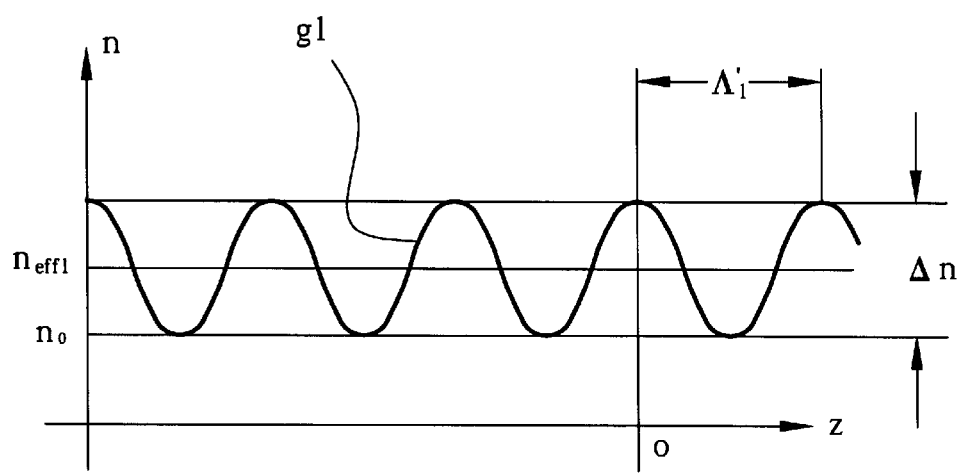
FIG. 2a is a graph of the refractive index modulation of a single Bragg grating along the fiber's longitudinal axis Z.

FIG. 2a is a graph of the refractive index modulation of a single Bragg grating g1 along the fiber's longitudinal axis Z. In FIG. 2a, O is the center point of g1, $n_0$ is the original fiber core average index. As shown in FIG. 2a, the refractive index modulation $n_1(z)$ of the single Bragg grating g1 can be represented by equation (2):

$$n_1(z) = n_0 + \Delta n_1 * \cos(2\pi Z / \Lambda_1') \quad (2)$$

Where $\Delta n_1$ is the peak reflective index modulation of g1 and $\Lambda_1'$ is the period of g1. Here, $\Lambda_1' = \Lambda_m/2$ and $\Lambda_m$ is the period of the phase mask used. $n_{eff1}$ is the effective refractive index after g1 is written.

Figure 2B:
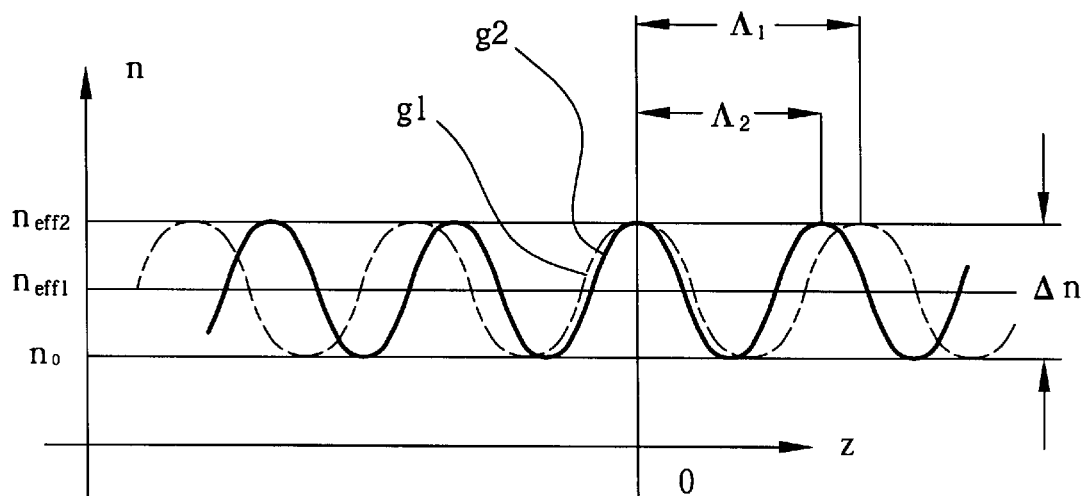
FIG. 2b is a graph of the refractive index modulation of two Bragg gratings superimposed along the fiber's longitudinal axis Z.

After inscribing the g1, the fiber portion where the g1 is written is stretched to another stress such that the period $\Lambda_1'$ of g1 is changed into $\Lambda_1$ as shown in FIG. 2b. And then, the second grating g2 is written. In the method of the present invention, generally a small stress is previously applied to the fiber before writing the first grating and then the stress is increased as required step by step to write consecutive gratings. Vice versa, a relatively large stress can also be applied previously to the portion of the fiber where multiple superimposed Bragg gratings are to be written before writing the first grating and then the stress is relaxed as required step by step to write consecutive gratings.

As shown in FIG. 2b, O is the center point of g1 and g2, the refractive index modulation $n_{1,2}(z)$ of the two superimposed Bragg gratings g1 and g2 can be represented by equation (3):

$$n_{1,2}(z) = n_0 + \Delta n_1 * \cos(2\pi Z / \Lambda_1) + \Delta n_2 * \cos(2\pi Z / \Lambda_2) \quad (3)$$

Where, $\Delta n_1$ is the peak reflective index modulation of g1, $\Delta n_2$ is the peak reflective index modulation of g2. Here, $\Lambda_2$ is the period of g2 which equals to $\Lambda_m/2$ and $\Lambda_1$ is the period of g1 which becomes $\Lambda_1' + \Delta \Lambda = \Lambda_m/2 + \Delta \Lambda$, $\Delta \Lambda$ is the change of period of g1 due to the changing of stress before writing g2. $n_{eff2}$ is the effective refractive index after both g1 and g2 are written. For simplicity, we assume $\Delta n_1 = \Delta n_2 = \Delta n$ as shown in FIGS. 2a–2b and then we can get $n_{eff1} = n_0 + \Delta n/2$, $n_{eff2} = n_0 + \Delta n$.

A typical photosensitive fiber is doped highly with Germanium in the core. Hydrogen loading (e.g. 140 atm at 25° C. for more than two weeks) can further improve the potential UV induced index change to a value of $10^{-2}$ order. It is now routine to obtain a photosensitive fiber with a total potential UV induced index change of about $(3-5) \times 10^{-2}$. The photosensitivity in optical fiber is discussed in detail in Andreas Othonos and Kyriacos Kalli, *Fiber Bragg Gratings* (Artech House, Boston-London, 1999), Chapter 2, P9–94.

Figure 3:
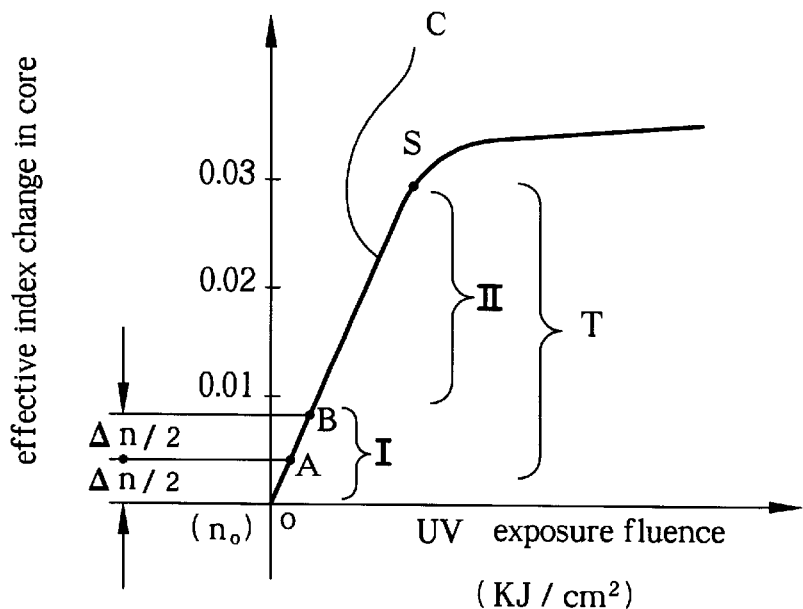
FIG. 3 is a schematic diagram of the relationship between the index change in the core and the UV exposure fluence ($KJ/cm^2$) of a typical photosensitive fiber.

FIG. 3 is a schematic diagram of the relationship between index change in the core and the UV exposure fluence ($KJ/cm^2$) (or UV exposure time, or number of UV exposure pluses) of a typical photosensitive fiber. In FIG. 3, $n_0$ is the average refractive index of the core before writing and T is the total linear region of the potential UV induced index change available (e.g. about $3 \times 10^2$). The curve C becomes saturated after point S. After writing a first grating g1, the effective refractive index changes $\Delta n/2$ to point A as shown in FIG. 3 and FIG. 2a. After both the first grating g1 and a second grating g2 are superimposed in the core, the effective refractive index changes An totally to point B as shown in FIG. 3 and FIG. 2b.

As the refractive index modulation $\Delta n$ for inscribing one Bragg grating can be smaller than $(1-2) \times 10^{-3}$, only a portion I (e.g. one-third) of the region T is needed to superimpose a plurality of gratings (e.g. 4–10 gratings). The portion II (e.g. two-third) of region T can be used to finely tune the wavelength interval of two superimposed fiber Bragg gratings to a required value or optimally tune the wavelength intervals of three or more superimposed fiber Bragg gratings to a required wavelength grid.

Figure 4:
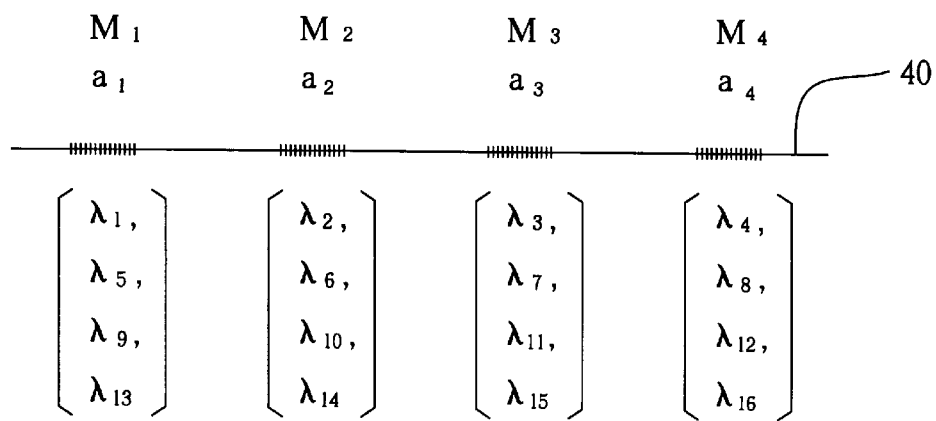
FIG. 4 shows a multi-channel system with four groups of four superimposed fiber Bragg gratings located at four different locations.

The method of the present invention has special advantages for fabricating multiple superimposed fiber Bragg gratings for multi-channel systems with narrow channel spacing, e.g. 100 GHz, 50 GHz, and a plurality of channels, e.g. 16 or more channels. FIG. 4 show a multi-channel system 400 with four groups of four superimposed fiber Bragg gratings located at four different locations. In FIG. 4, four groups ($M_1$, $M_2$, $M_3$, $M_4$) of multiple superimposed fiber Bragg gratings are fabricated at four different locations ($a_1$, $a_2$, $a_3$, $a_4$) of fiber 40. Each group contains four superimposed fiber Bragg gratings.

If the channel spacing of system is 100 GHz, the channel spacing in each group is 400 GHz. Similarly, if the channel spacing of system is 50 GHz, the channel spacing in each group becomes 200 GHz. However, it should be noted that each grating itself in each group is not necessarily designed to meet the requirements of 400 GHz spacing or 200 GHz spacing. They can be designed according to the requirements of 100 GHz spacing, 50 GHz spacing, or even smaller spacing. A system with 32 or more channels can also be grouped into 4, 8 or more groups.

Without loss of generality, two examples are provided as follows to exemplify the method of the present invention:

Example 1

In example 1, two Bragg gratings with a required wavelength interval S of 3.2 nm (about 400 GHz) are written by using the system shown in FIGS. 1a –1b in a same portion of a photosensitive fiber which has similar photosensitive property as shown in FIG. 3. It should be noted that the wavelength response of each grating is not limited to meet the requirements of 400 GHz spacing. The wavelength response of each grating can be designed to meet the requirements for 200 GHz, 100 GHz, 50 GHz, 25 GHz or smaller spacing.

The $n_0$ of the fiber is 1.45. The phase-mask used in this example is made by Stock Yale Inc. (Quebec, Canada) with a period $\Lambda_m$ Of 1070 nm. The length of the writing fringe is about 20 mm.

Step 1: subjecting the fiber portion to a first stress, e.g by slightly stretching the fiber portion bi-directionally with same distance such that the center of the portion is kept substantially fixed with respect to the phase mask where;

Step 2: applying a collimating UV light beam through the phase mask to create the first Bragg grating, UV exposure is stopped when the induce effective index change is measured as $10^{-3}$. The period and the wavelength of the first grating are:

$\Lambda_1' = \Lambda_m/2 = 535$ nm $\lambda 1' = 2(n_0 + 0.001) * (\Lambda_m/2) = 2 * 1.451 * 535 = 1552.57$ nm;

Step 3: subjecting the fiber portion to a second stress, e.g. by stretching the fiber portion bi-directionally with a same predetermined distance such that the center of the portion is kept substantially fixed with respect to the phase mask.

For a required wavelength interval S (3.2 nm) between the two gratings, the period of the first grating should be stretched from 535 nm to 536.102 nm before writing the second grating. For a 20 mm long grating which has nearly 20000 μm/0.535 μm=37383 layers, the length of the first grating should be stretched by 37383*(536.102–535.000)= 41196 nm=41.200 μm. Unfortunately, this value is relatively expensive and difficult to be tuned precisely. But it is relatively easy and practical to control the actual changing of length of the grating under this value within a range of about 1 μm. In this example, the period of the first grating is stretched to about 536.085 nm that is slightly smaller than expected 536.102 nm. The length of the first grating is stretched by about 40.561 μm. By this arrangement, the actual changing of length of the grating can be practically controlled below 41.12 μm and fine-tuning of the wavelength interval is performed by following step 5;

Step 4: Applying the collimating UV light beam through the phase mask to create the second Bragg grating, UV exposure is stopped when the induce effective index change is measured for another $10^{-3}$. The periods ($\Lambda_1, \Lambda_2$) and the wavelengths ($\lambda_1, \lambda_2$) of the first grating and the second grating are now:

$\Lambda_1$=536.085 nm $\lambda_1$=2*($n_0$+0.002)*$\Lambda_1$=2*1.452*536.085=1556.791 nm;

$\Lambda_2=\Lambda_m$=535.000 nm $\lambda_2$=2*($n_0$+0.002)*$\Lambda_2$=2*1.452*535=1553.640 nm;

The tentative wavelength interval S'=3.151 nm.

Step 5: tuning the tentative Bragg wavelength interval S' substantially to the required Bragg wavelength interval S by changing the effective refractive index of the portion. This is performed by applying a substantially uniform UV light beam directly on the portion covering both the first and the second Bragg gratings for a predetermined period of time to provide a further index change $\Delta n_t$. If $\Delta n_t$ is 2.00×$10^{-2}$, S' (3.151 nm) can be tuned to 3.194 nm. After tuning, the wavelengths ($\lambda_{1t}, \lambda_{2t}$) of the first and second gratings are:

$\lambda_{1t}$=2*(1.452+0.02)*536.085=1578.234 nm;

$\lambda_{2t}$=2*(1.452+0.02)*535=1575.040 nm; and

The wavelength interval after tuning ($S_t$) is $S_t=\lambda_{1t}-\lambda_{2t}$= 3.194 nm.

Due to the errors in stretching the length of the fiber, the tentative wavelength interval S' may vary in a small range near 3.151 nm, e.g. 3.120–3.180 nm. By selecting different values of $\Delta n_t$, the tentative wavelength interval S' can be finely tuned to a required interval. It is apparent to those skilled in the art that $\Delta n_t$ can be monitored and measured in real time by the OSA.

The method described in this example may further have step of tuning the Bragg wavelength of the first Bragg grating by changing the effective refractive index of the fiber portion before creating the second Bragg grating, e.g. by applying a substantially uniform UV light beam directly to the fiber portion containing the first Bragg grating.

It is apparent to those skilled in the art that the method described in this example should not be considered to be limited in inscribing multiple superimposed fiber Bragg gratings with only two Bragg gratings. This method is well suited for inscribing multiple superimposed fiber Bragg gratings with two or more Bragg gratings. The first and the second fiber Bragg gratings should be considered as any two of all fiber Bragg gratings superimposed at a same location/ portion of a photosensitive fiber. The tentative Bragg wavelength interval S' and the required Bragg wavelength interval S between the first and the second fiber Bragg gratings should be considered as the tentative Bragg wavelength interval and the required/target Bragg wavelength interval between any two of all fiber Bragg gratings superimposed at a same location/portion of a photosensitive fiber.

Example 2

In this example, three Bragg gratings with required wavelength intervals $S_1$, $S_2$ of 3.2 nm (400 GHz) are written by using the system shown in FIGS. 1a–1b in a same portion of a photosensitive fiber which has similar photosensitive property as shown in FIG. 3. Similarly, it should be noted that the wavelength response of each grating is not limited to meet the requirements of 400 GHz spacing. The wavelength response of each grating can be designed to meet the requirements for 200 GHz, 100 GHz, 50 GHz, 25 GHz or smaller spacing.

The $n_0$ of the fiber is 1.45. The phase-mask used in this example the same one as used in Example 1.

Step 1: subjecting the fiber portion to a first stress, e.g. by slightly stretching the fiber portion bi-directionally with same distance such that the center of the fiber portion is kept substantially fixed with respect to the phase mask where;

Step 2: applying a collimating UV light beam through the phase mask to create the first Bragg grating, UV exposure is stopped when the induce effective index change is measured as $10^{-3}$. The period and the wavelength of the first grating are:

$\Lambda_1''=\Lambda_m/2$=535 nm $\lambda_1''$=2($n_0$+0.001)*($\Lambda_m$/2)=2*1.451*535=1552.570 nm;

Step 3: subjecting the fiber portion to a second stress, a e.g. by stretching the fiber portion bi-directionally with a same predetermined distance such that the center of the portion is kept substantially fixed with respect to the phase mask. Similar to Example 1, the period of the first grating is stretched to about 536.080 nm that is slightly smaller than expected 536.102 nm to create a wavelength interval of 3.2 nm;

Step 4: Applying the collimating UV light beam through the phase mask to create the second Bragg grating, UV exposure is stopped when the induce effective index change is measured for another $10^{-3}$. The periods ($\Lambda_1', \Lambda_2'$) and the wavelengths ($\lambda_1', \lambda_2'$) of the first grating and the second grating are now:

$\Lambda_1^{1'}$=536.080 nm $\lambda_1'$=2*($n_0$+0.002)*$\Lambda_1'$=2*1.452*536.08=1556.776 nm;

$\Lambda_2'=\Lambda_m$=535.000 nm $\lambda_2'$=2*($n_0$+0.002)*$\Lambda_2'$=2*1.452*535=1553.640 nm;

Step 5: subjecting the fiber portion to a second stress, e.g. by stretching the fiber portion bi-directionally with a same predetermined distance such that the centers of the first and second gratings are kept substantially fixed with respect to the phase mask. The period of the first grating is stretched to about 537.160 nm and the period of the second grating is stretched to about 536.080 nm accordingly. Similar to Example 1, each of them is stretched to a value slightly smaller than required to obtain a 3.2 nm wavelength interval;

Step 6: Applying the collimating UV light beam through the phase mask to create the third Bragg grating, UV exposure is stopped when the induce effective index change is measured for another $10^{-3}$. The periods ($\Lambda_1, \Lambda_2, \Lambda_3$) and the wavelengths ($\lambda_1, \lambda_2, \lambda_3$) of the first grating, the second grating and the third grating are now:

$\Lambda_1$=537.160 nm $\lambda_1$=2*($n_0$+0.003)*$\Lambda_1$=2*1.453*537.160=1560.987 nm;

$\Lambda_2$=536.080 nm $\lambda_2$=2*($n_0$+0.003)*$\Lambda_1$=2*1.453*536.080=1557.848 nm;

$\Lambda_3$=$\Lambda_m$=535.000 nm $\lambda_3$=2*($n_0$+0.003)*$\Lambda_3$=2*1.453*535=1554.710 nm;

The tentative wavelength intervals:

$S_1'$=($\lambda_1$-$\lambda_2$)=3.138 nm $S_2'$=($\lambda_2$-$\lambda_3$)=3.138 nm;

Step 7: tuning the tentative Bragg wavelength intervals $S_1'$, $S_2'$ optimally to the required Bragg wavelength interval $S_1$, $S_2$ by changing the effective refractive index of the portion. This is performed by applying a substantially uniform UV light beam directly on the portion covering both the first and the second Bragg gratings for a predetermined period of time to provide a further index change $\Delta n_t$. If $\Delta n_t$ is 2.00×10$^{-2}$, S1', S2' (3.138 nm) can be tuned to 3.182 nm. After tuning, the wavelengths ($\lambda_{1t}$, $\lambda_{2t}$, $\lambda_{3t}$) of the first, second and third gratings are:

$\lambda_{1t}$=2*(1.453+0.02)*537.160=1582.473 nm;

$\lambda_{2t}$=2*(1.453+0.02)*536.080=1579.292 nm; and $\lambda_{3t}$=2*(1.453+0.02)*535=1576.110 nm.

The wavelength intervals after tuning ($S_{1t}$,$S_{2t}$) are $S_{1t}$=$\lambda_{1t}$-$\lambda_{2t}$=3.182 nm and $S_{2t}$=$\lambda_{2t}$-$\lambda_{3t}$=3.182 nm.

Due to the errors in stretching the length of the fiber, the tentative wavelength interval $S_1'$ and $S_2'$ are most likely different. For example, the actually obtained $S_1'$ is 3.197 nm and the $S_2'$ is 3.168 nm ($\Lambda_1$=537.190 nm, $\Lambda_2$=536.090 nm and $\Lambda_3$=$\Lambda_m$=535.000 nm). By deciding an optimal $\Delta n_t$, the tentative wavelength interval $S_1'$ and $S_2'$ can be optimally tuned to required wavelength intervals. In this example, the minimum mean square error method is used to decide the optimal $\Delta n_t$ required. The optimal $\Delta n_t$ should meet the condition of equation (4):

$$(S_{1t}-S)^2+(S_{2t}-S)^2=\text{minimum} \quad (4)$$

Where S is the target wavelength interval (3.2 nm), $S_{1t}$, $S_{2t}$ are wavelength intervals after the fiber is subjected to a further index change of $\Delta n_t$:

$$S_{1t}=2*(1.453+\Delta n_t)*(\Lambda_1-\Lambda_2) \quad (5)$$

$$S_{2t}=2*(1.453+\Delta n_t)*(\Lambda_2-\Lambda_3) \quad (6)$$

According to Equations (4) to (6), it can be readily obtained that when $\Delta n_t$=0.008, the condition of equation (4) can be met. After tuning by applying this optimal index change of 0.008, the wavelengths ($\lambda_{1t}$, $\lambda_{2t}$, $\lambda_3$t) of the first, second and third gratings are:

$\lambda_{1t}$=2*(1.453+0.008)*537.190=1569.669 nm;

$\lambda_{2t}$=2*(1.453+0.008)*536.090=1566.455 nm; and $\lambda_{3t}$=2*(1.453+0.008)*535=1563.270 nm.

The wavelength intervals after tuning optimally ($S_{1t}$,$S_{2t}$) are $S_{1t}$=$\lambda_{1t}$-$\lambda_{2t}$=3.214 nm and $S_{2t}$=$\lambda_{2t}$-$\lambda_{3t}$=3.185 nm.

The tentative wavelength interval $S_1'$ and $S_2'$ are optimally tuned from 3.197 nm and 3.168 nm to 3.214 nm and 3.185 nm by applying a substantially uniform UV light beam directly on the portion covering all Bragg gratings for a predetermined period of time to provide an optimal index change of 0.008. In this example, the required wavelength intervals are same. It is apparent to those skilled in the art that this optimal approach is also applicable to uneven wavelength intervals.

The method described in this example can further have step of tuning the Bragg wavelength of the first Bragg grating by changing the effective refractive index of the portion before writing the second Bragg grating, e.g. by applying a substantially uniform UV light beam directly on the portion. The method can also further have step of tuning the Bragg wavelength of the first Bragg grating, the Bragg wavelength of the second Bragg grating and the Bragg wavelength difference between the first and the second Bragg gratings by change the effective refractive index of the portion, e.g. by applying a substantially uniform UV light beam directly on the portion, before writing the third Bragg grating.

It is apparent to those skilled in the art that other methods, either chemical, physical or mechanical, which can change the effective refractive index of a portion of a photosensitive fiber can be used in the method of the present invention.

It is also apparent to those skilled in the art that the method of this example should not be considered to be limited in inscribing superimposed multiple fiber Bragg gratings with only three Bragg gratings. This method is well suited for inscribing superimposed multiple fiber Bragg gratings with three or more Bragg gratings. The optimal method used in this example to decide the optimal index change needed or the predetermined period of UV exposure time for optimally tuning the tentative Bragg wavelength intervals to the required Bragg wavelength intervals, e.g. ITU wavelength plan, is well suited for fabricating superimposed multiple fiber Bragg gratings with three or more fiber Bragg gratings.

It is apparent to those skilled in the art that the method described in the present application is also applicable to the fabrication of blazed gratings, non-uniform gratings, phase-shifted gratings and variable pitch gratings such as chirped gratings. The Bragg grating wavelength of this application should not be considered limited to Bragg grating center wavelength or peak reflective wavelength of fiber Bragg gratings, but rather should be understood to include all other characterized or non-characterized definitions of Bragg grating wavelength of different kinds of fiber gratings familiar to those skilled in the art.

The present invention should not be considered limited to the particular examples described above, but rather should be understood to cover all aspects of the present invention as fairly set out in the attached claims. Various modifications, equivalents, as well as numerous geometrical configurations to which the present invention may be applicable will be readily apparent to those skilled in the art to which the present invention is directed upon review of the present specification.

What is claimed is:

1. A method of fabricating a first Bragg grating and a second Bragg grating in a portion of a photosensitive fiber, said first and said second Bragg gratings being overlapped and having a required Bragg wavelength interval S, said method comprising:

disposing an optical phase mask adjacent to said portion;

subjecting said portion to a first predetermined longitudinal stress;

applying a collimating UV light beam through said phase mask to create said first Bragg grating in said portion;

subjecting said portion to a second predetermined longitudinal stress;

applying said collimating UV light beam through said phase mask to create said second Bragg grating in said portion, said first and said second predetermined stresses being selected to produce a tentative Bragg wavelength interval S' between said first and said second Bragg gratings such that said tentative Bragg wavelength interval S' is slightly smaller than said required Bragg wavelength interval S; and tuning said tentative Bragg wavelength interval S' substantially to said required Bragg wavelength interval S by changing the effective refractive index of said portion.

2. The method of claim 1, wherein said tuning said tentative Bragg wavelength interval S' substantially to said required Bragg wavelength interval S comprises applying a substantially uniform UV light beam directly on said portion covering both said first and said second Bragg gratings for a predetermined period of time.

3. The method of claim 1, wherein said subjecting said portion to a first predetermined longitudinal stress comprises stretching said portion bi-directionally and simultaneously such that the center of said portion is kept substantially fixed with respect to said phase mask.

4. The method of claim 1, wherein said subjecting said portion to a second predetermined longitudinal stress comprises stretching said portion bi-directionally and simultaneously such that the center of said portion is kept substantially fixed with respect to said phase mask.

5. The method of claim 1, wherein said phase mask is an even period phase mask.

6. The method of claim 1, wherein said phase mask is a non-even period phase mask.

7. The method of claim 1, wherein said collimating UV light beam is provided by a UV source selected from a group consisting of excimer laser, frequency-doubled dye laser, frequency-doubled parametric oscillator, argon ion laser and copper vapor laser.

8. The method of claim 2, wherein said collimating UV light beam and said substantially uniform UV light beam are provided by a same UV source.

9. The method of claim 1, wherein said portion of said photosensitive fiber is coupled to a source and an optical spectral analyzer for monitoring.

10. The method of claim 9, wherein said source is selected from a group consisting of white source and wavelength tunable source.

11. The method of claim 10, wherein said white source comprises broadband LED.

12. The method of claim 10, wherein said wavelength tunable source comprises tunable diode laser.

13. The method of claim 1, further comprising tuning the Bragg wavelength of said first Bragg grating by changing the effective refractive index of said portion before creating said second Bragg grating.

14. The method of claim 13, wherein said tuning the Bragg wavelength of said first Bragg grating comprises applying a substantially uniform UV light beam directly on said portion.

15. A method of fabricating a first Bragg grating, a second Bragg grating and a third Bragg grating in a portion of a photosensitive fiber, said first, said second and said third Bragg gratings being overlapped and having a first required Bragg wavelength interval $S_1$ between said first and said second Bragg gratings and a second required Bragg wavelength interval $S_2$ between said second and said third Bragg gratings, said method comprising:

disposing an optical phase mask adjacent to said portion;

subjecting said portion to a first predetermined longitudinal stress;

applying a collimating UV light beam through said phase mask to create said first Bragg grating in said portion;

subjecting said portion to a second predetermined longitudinal stress;

applying a collimating UV light beam through said phase mask to create said second Bragg grating in said portion;

subjecting said portion to a third predetermined longitudinal stress;

applying said collimating UV light beam through said phase mask to create said third Bragg grating in said portion, said first, said second and said third predetermined stresses being selected to produce a first tentative Bragg wavelength interval $S_1'$ between said first and said second Bragg gratings and a second tentative Bragg wavelength interval $S_2'$ between said second and said third Bragg gratings such that said first tentative Bragg wavelength interval $S_1'$ and said second tentative Bragg wavelength interval $S_2'$ are slightly smaller than said first required Bragg wavelength interval $S_1$ and said second required Bragg wavelength interval $S_2$ respectively; and tuning said first and said second tentative Bragg wavelength intervals $S_1'$, $S_2'$ optimally to said first and said second required Bragg wavelength intervals $S_1$, $S_2$ by changing the effective refractive index of said portion.

16. The method of claim 15, wherein said tuning said first and said second tentative Bragg wavelength intervals $S_1'$, $S_2'$ optimally to said first and said second required Bragg wavelength intervals $S_1$, $S_2$ comprises applying a substantially uniform UV light beam directly on said portion covering said first, said second and said third Bragg gratings for a predetermined period of time.

17. The method of claim 16, wherein said predetermined period of time is decided by an optimal method.

18. The method of claim 17, wherein said optimal method comprises minimum mean square error method.

19. The method of claim 15, wherein said subjecting said portion to a first predetermined longitudinal stress comprises stretching said portion bi-directionally and simultaneously such that the center of said portion is kept substantially fixed with respect to said phase mask.

20. The method of claim 15, wherein said subjecting said portion to a second predetermined longitudinal stress comprises stretching said portion bi-directionally and simultaneously such that the center of said portion is kept substantially fixed with respect to said phase mask.

21. The method of claim 15, wherein said subjecting said portion to a third predetermined longitudinal stress comprises stretching said portion bi-directionally and simultaneously such that the center of said portion is kept substantially fixed with respect to said phase mask.

22. The method of claim 15, wherein said phase mask is an even period phase mask.

23. The method of claim 15, wherein said phase mask is a noneven period phase mask.

24. The method of claim 15, wherein said collimating UV light beam is provided by a UV source selected from a group consisting of excimer laser, frequency-doubled dye laser, frequency-doubled parametric oscillator, argon ion laser and copper vapor laser.

25. The method of claim 16, wherein said collimating UV light beam and said substantially uniform UV light beam are provided by a same UV source.

26. The method of claim 15, wherein said portion of said photosensitive fiber is coupled to a source and an optical spectral analyzer for monitoring.

27. The method of claim 26, wherein said source is selected from a group consisting of white source and wavelength tunable source.

28. The method of claim 27, wherein said white source comprises broadband LED.

29. The method of claim 27, wherein said wavelength tunable source comprises tunable diode laser.

30. The method of claim 15, further comprising tuning the Bragg wavelength of said first Bragg grating by changing the effective refractive index of said portion before creating said second Bragg grating.

31. The method of claim 30, wherein said tuning the Bragg wavelength of said first Bragg grating comprises applying a substantially uniform UV light beam directly on said portion.

32. The method of claim 15, further comprising tuning the Bragg wavelength of said first Bragg grating, the Bragg wavelength of said second Bragg grating and the Bragg wavelength difference between said first and said second Bragg gratings by change the effective refractive index of said portion before creating said third Bragg grating.

33. The method of claim 32, wherein said tuning the Bragg wavelength of said first Bragg grating, the Bragg wavelength of said second Bragg grating and the Bragg wavelength difference between said first and said second Bragg gratings comprises applying a substantially uniform UV light beam directly on said portion.

* * * * *